April 10, 1962 G. DIRKS 3,029,020
DATA-CONVERSION DEVICES
Filed May 5, 1958 2 Sheets-Sheet 1
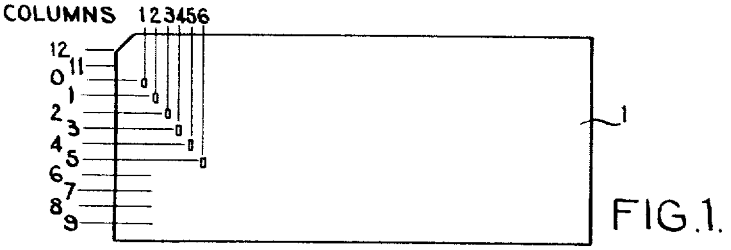
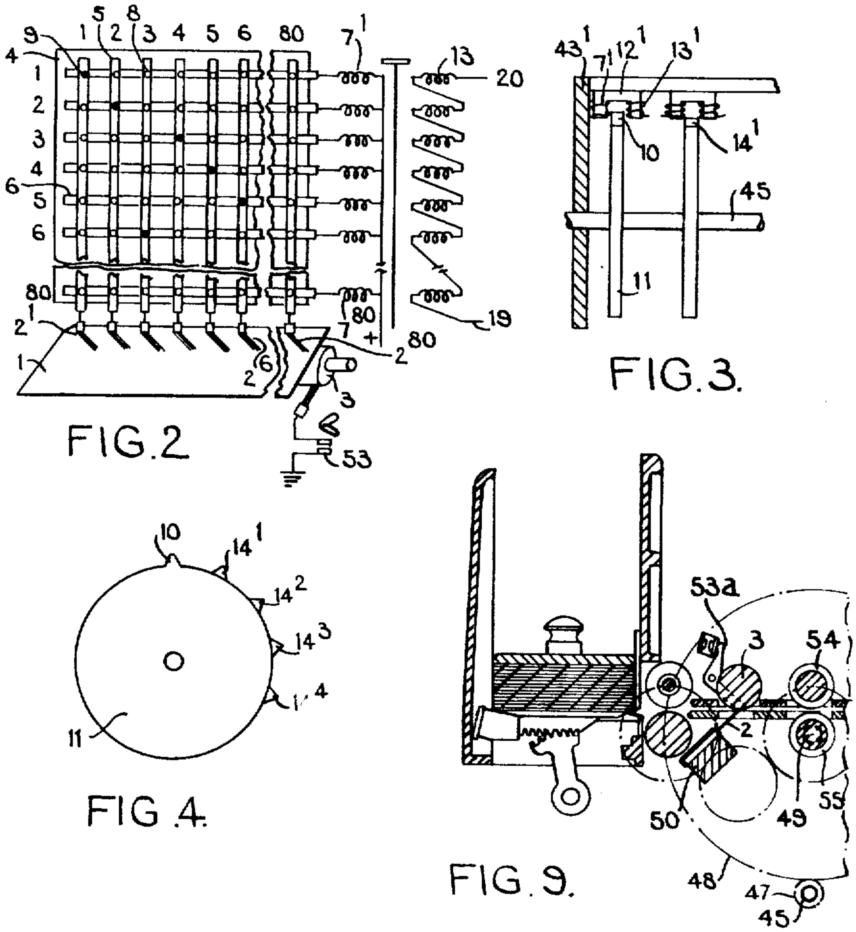
FIG. 2, FIG. 3, FIG. 4, FIG. 9
INVENTOR
Gerhard Dirks
BY Michael S. Striker
ATTORNEY April 10, 1962 G. DIRKS 3,029,020

DATA-CONVERSION DEVICES

Filed May 5, 1958 2 Sheets-Sheet 2

INVENTOR
Gerhard Dirks
BY
Michael S. Striker
ATTORNEY

United States Patent Office 3,029,020

Patented Apr. 10, 1962

3,029,020

DATA-CONVERSION DEVICES

Gerhard Dirks, Morfelder Landstrasse 44, Frankfurt am Main, Germany

Filed May 5, 1958, Ser. No. 732,891
Claims priority, application Germany Oct. 1, 1948
8 Claims. (Cl. 235—61.6)

Continuation-in-part of patent application No. 432,295, now abandoned, filed May 25, 1954, itself being a continuation-in-part of application No. 101,032, now abandoned, filed June 24, 1949.

This invention relates to the conversion of data sensed from record cards and the like for use in business machines and computers. Record cards may contain data recorded in columns, each column containing one or more items of data each recorded in predetermined positions, an item of data having significance by virtue of the position in which it is recorded in the column. In reading data from such cards it is common for all columns to be sensed simultaneously, the positions in each column being sensed sequentially. Hitherto, when data read from these cards in this way was required to be presented column by column, a buffer storage device was used consisting of electromagnetic or electronic relays into which the whole of the sensed data was entered in parallel and the data contained in each column was then read out in turn, thus effecting the transmission of the sensed data in a form appropriate for serially operating office machines. This necessitated a very large number of relays, not less than four per column of data.

It is an object of the present invention to avoid the necessity for such buffer storage.

A further object is to sense the record card in normal manner but to distribute data sensed from the card immediately it is sensed and to record it on a member having cyclic movement relative to recording means.

In accordance with the invention a sensing means is used to sense the data record, all columns of the record being sensed simultaneously, the data within each of the columns being sensed progressively index point by index point, and the data from all columns as available at each index point is in turn distributed to recording means to effect storage in a closed track on a rotating magnetic drum or disc scanned by the recording means, specific positions along the track representing pre-selected specific data columns.

The invention will be described as applied to electrical sensing of a standard record card and a magnetic disc or drum, utilising an inductive distributor to effect the distribution.

The invention will now be described with reference to the accompanying drawings in which:

FIGURE 1 shows a record card;

FIGURE 2 shows a plugboard for altering the columnar sequence of data sensed from a card;

FIGURE 3 shows a side view of a distributor;

FIGURE 4 shows another view of the distributor;

FIGURE 9 shows a record card feeding and sensing means.

Figures 5, 6, 7, 8:
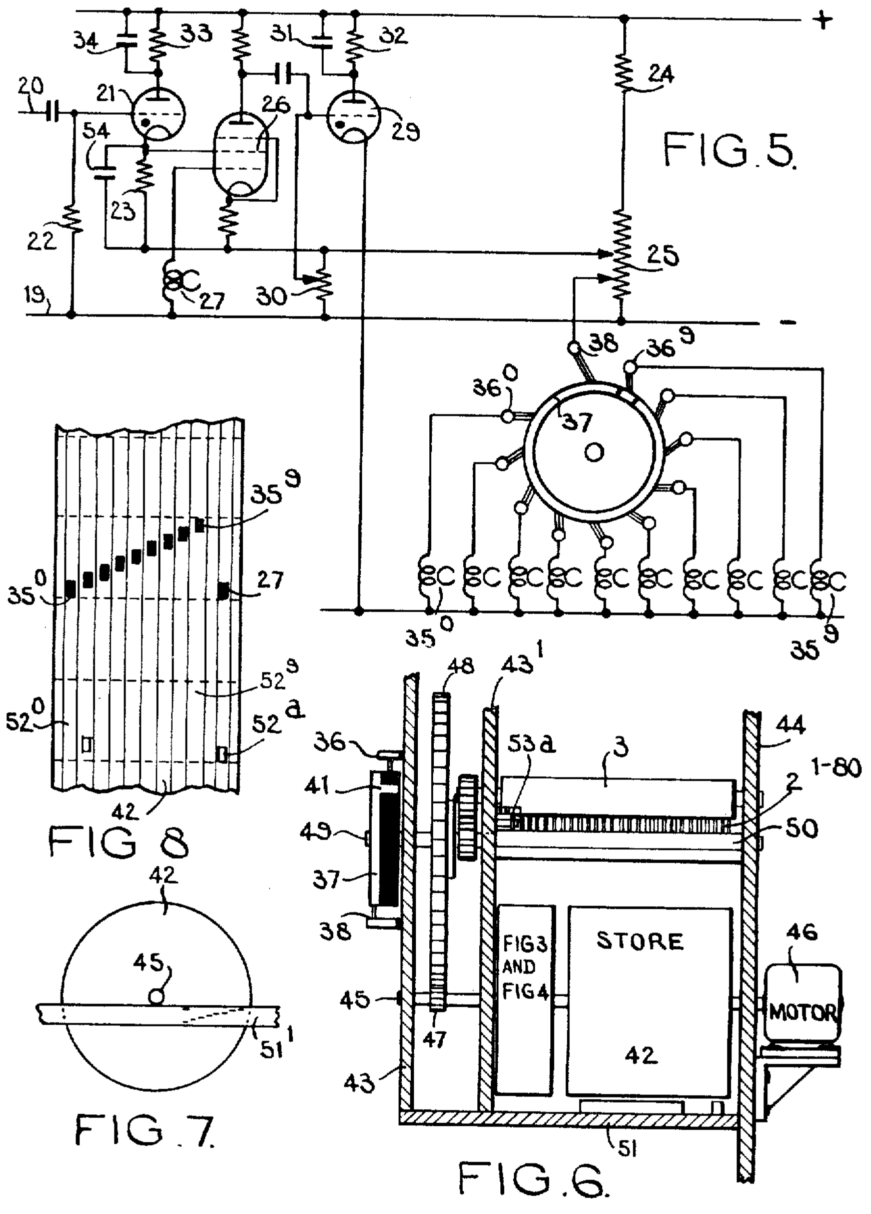
FIGURE 5 is a circuit diagram of the distributor and a recording means.
FIGURE 6 shows, schematically, the mechanical couplings between the various items of apparatus employed.
FIGURE 7 shows a magnetic recording disc, as an alternative to the magnetic drum of FIGURE 6.
FIGURE 8 shows, schematically, two recording areas on a magnetic recording medium.

In accordance with the invention a record card has data recorded at index points in columns, all columns of the card being sensed in parallel, the index points in each column being sensed sequentially, and the data, as it is read, is distributed by an inductive distributor and is recorded in predetermined areas on a magnetic drum or disc.

FIGURE 1 shows a standard record card having eighty columns, each column being divided into twelve index points. For the purposes of example, columns 1 to 6 have been punched with holes indicating values 0 to 5. These columns may, however, have significance denominationally in a different order and are required to read a value of 1, 5, 2, 3, 4, i.e. a revised columnar order of 1, 2, 6, 3, 4, 5.

A plugboard is provided (shown in FIGURE 2) to effect such re-distribution. The card 1 is fed with its "12" edge leading under brushes 2 (1 to 80). These brushes are adapted to make contact with a sensing roll 3 wherever a hole has been punched in the card. The cross plugboard comprises an insulating frame 4 supporting eighty vertical metallic strips 5 spaced apart from each other and each connected to a sensing brush 2. The first six columns and the eightieth are shown, the rest being broken away. The frame 4 also supports a series of horizontal strips 6 spaced apart from the vertical strips, and likewise positions 1 to 6 and 80 are shown, the rest being broken away. Each horizontal strip is connected to the input windings 7 (1 to 80) of an inductive distributor. At all the cross points of the strips 5 and 6 are holes 8 into which metallic plugs 9 may be inserted to effect cross connection. Plugs 9 have been inserted to connect the vertical columns to the horizontal rows in accordance with the example quoted above. The inductive distributor (shown in FIGURES 3, 4 and 6) comprises an inductive yoke 10 carried on a wheel 11. Positioned to co-operate with the yoke 10 are a series of magnetisable cores 12 carrying one of the input windings 7 and an output winding 13. FIGURE 3 shows one such core in co-operation with its yoke 10. The cores 12 are disposed on a frame supported by side wall 43 around the circumference of the wheel and the radial position of each core governs the position in which recording will be effected. Since there are eighty cores, for ease of spatial distribution of these cores around the circumference of the wheel 11 it is preferred to employ several such wheels, each carrying its own yoke 14[1], 14[2], 14[3], and 14[4]. These yokes are staggered in relation to each other and each wheel co-operates with sixteen cores. The staggering of the yokes and their co-operation with the cores is such that operationally this is equivalent to the single wheel with the eighty cores distributed around its circumference.

When a brush 2 (1 to 80) senses a hole in the card at a given index point a circuit is completed from ground, conventional card lever contacts 53, sensing roll 3, the appropriate brush 2 and its associated vertical strip 4 via connecting plug 9 to the plugboard horizontal strip 6 then to the input winding 7 and then to the positive line. The output windings 13 (1 to 80) are all connected in series and are coupled by means of lines 19 and 20 (FIGURE 2 and FIGURE 5) to a gas discharge tube 21. The transformer action existing between the input and output windings on a core 12 (FIGURE 2) in the absence of the yoke 10, on the corresponding one of the yokes 14[1] to 14[4], is such that a pulse developed in the output winding circuit by reason of the energisation of an input winding is of insufficient magnitude to effect firing of the gas discharge tube 21 (FIGURE 5). However, when the yoke 10, or its equivalent, traverses a core whose input winding is energised a pulse is developed in the output circuit of sufficient amplitude to cause the tube 21 to fire. The tube is normally biassed beyond cut off by means of resistor 22 between its grid and negative line 19. The anode of the tube contains a self-quenching circuit composed of a resistor 33 and a capacitor 34 in parallel, and the action of this circuit is such that the tube is extinguished after a time interval dependent upon the time constant of the quenching circuit corresponding to the time of scanning a denomination sector of the recording drum or disc.

The cathode of the tube 21 is coupled through a resistor 23 to a potential divider network consisting of resistors 24 and 25 connected between the positive and negative supply lines. A second connection between the cathode of the tube 21 and the screen grid of a pentode tube 26 allows the potential of this screen grid to rise when the tube 21 fires. The cathode of the tube 26 is also connected to the potential divider consisting of resistors 24 and 25 so that the rise in potential of the screen grid of tube 26 is equal to the potential developed across resistor 23 when the tube 21 fires. The tube 26 with gas tube 21 non-conducting is biassed by the connections of its cathode to a potentiometer formed by resistors 24 and 25 so that with its control grid connected to the negative line via a sensing head 27 and its screen grid at the voltage of the cathode of gas tube 21 it is but slightly conducting. Firing of gas tube 21 under the influence of one of the yokes 10, $14^1$—$14^4$ applies by its cathode full voltage to the screen of pentode 26. The anode of tube 26 is coupled capacitatively to the grid of gas tube 29 biassed to prevent firing by its grid being connected to resistors 30 and 25 respectively of the potentiometer network resistors 24 with 25 and 30. This full conduction tends to further cut off gas discharge tube 29 but upon the tube 26 being cut off by a negative signal generated in sensing head 27 tube 26 delivers a positive impulse to effect firing of gas tube 29. The subsequent self-extinguishing of gas tube 21 results in a slower change of conductivity (due to capacitor 54 discharging across resistor 23) so that the positive impulse delivered to gas tube 29 is not sufficient to effect firing of gas tube 29 again. Thus only this rise due to head 27 will effect firing of the gas discharge tube 29. This gas tube 29 has a similar self-quench circuit (determined by the time constant of a capacitor 31 and a resistor 32 in its anode circuit) so that it extinguishes after a time comparable to the required recording signal duration. The gas discharge tube 29 has its cathode connected in common to ten recording heads $35^0$ to $35^9$. These heads are connected to contact brushes $36^{0-9}$ (FIGURES 5 and 6) of a commutator 37 having one contact 41 on its surface for connection in turn to each of brushes $36^{0-9}$. A brush 38 continuously makes contact with a common ring 40 of the commutator which is connected in turn to the contact 41. The brush 38 is connected to a biassing point on the potentiometers 24, 25 as previously referred to. The head 27 is positioned on track **52*a* (FIGURE 8) almost opposite head $35^0$ on track $52^0$ and senses recording marks placed in the "0" position in each denomination or sector of the track 52*a*. The heads $35^{1-9}$ are positioned in their respective sub-tracks $52^{1-9}$ so that with the reading head 27 sensing a "0" mark in track 52*a* the recording heads $52^{0-9}$ are each in position to start recording in positions corresponding to their digital code value in the sector sub-tracks $52^{0-9}$**.

The relationship between card feed commutator, distributor and magnetic recording tracks is shown schematically in FIGURE 6 in front elevation. The card feed is broken away to show the shaft 49 beneath.

Supported between frame members 43 and 44 is a shaft 45 driven by a motor 46. The shaft carries the magnetic drum or disc 42, the distributor of FIGURES 3 and 4 and a gear wheel 47 driving a gear wheel 48 mounted on a shaft 49. Shaft 49 carries the rotating commutator element 37 and the feed roll 55 and is geared to the other feed rolls. Between the two sets of feed rolls is the sensing roll 3 co-operating with the sensing brushes 2 supported by an insulating cross bar 50 carried by support plates 43 and 44.

Also driven by a gearing from the shaft 49 is a card feed mechanism consisting of a reciprocating picker and sensing roll operating in well-known manner. A well-known card feed such as is used in business machines appropriate for this purpose is shown in side view in FIGURE 9. This feed is described in detail in re-issue patent specification No. 21,133 and comprises briefly a card stacker containing cards fed by a reciprocating knife. The cards are fed through a throad to feed rolls and thence over a card lever **53*a* associated with contacts 53 and the brush sensing station comprising the bar 50, brushes 2 and roll 3, to a further pair of feed rolls 54 and 55. The feed rolls and the knife are synchronously operated by, for instance, 1:1 gearing from shaft 49 of FIGURE 6 so that the commutator brushes complete circuits as each index point is sensed. The usual card lever operated contact 53** disconnects the sensing roll from ground in the absence of a card to be sensed.

The shaft 49 makes one complete revolution for each card feed and the brushes 36 (0 to 9) are arranged to close their contact with element 41 at the time of index point sensing of the record card. There is normally a slight interval between successive cards. The gear ratio 47 and 48 is so arranged that the magnetic drum and distributor on shaft 45 makes at least one complete revolution for each index point in the cycle of shaft 49.

The recording heads may be arranged to co-operate with a circular track, either on the cylindrical face or the flat face of the drum 42. In FIGURE 6 they are shown mounted on cross bar 51 supported by the side members 43 and 44 to co-operate with the cylindrical face of drum 42. In the alternative of FIGURE 7 they are shown supported on cross bar 51' mounted on the side wall 44 to co-operate with the disc face of member 42.

The magnetisable area of the drum or disc may be regarded as divided into sectors into each of which one card column is to be recorded, the successive eighty sectors being arranged in a circular track in case of FIGURE 6 or 7. Two such sectors are shown in FIGURE 8. As previously stated the head 27 co-operates with a zero mark in sub-track **52*a* in which "0" positions have been recorded in each sector. The ten heads $35^{0-9}$ are disposed in ten sub-tracks $52^{0-9}$ and the "0" head is aligned with the "0" position in the track when head 27 is over its zero mark and likewise each of the other heads $52^{1-9}$ is aligned over the areas in which it is to effect recording representative of the appropriate digit. Hence when the distributor at index point "0" in the card cycle receives an implse via a plugboard column 1 it will be distributed at the time when the yoke 10 completes the magnetic circuit of the now magnetised core 12' causing firing of gas tube 21, and a very slightly later time when the head 27 is opposite its "0" mark the "0" head will be caused to record by the firing of tube 29. Similarly at "1" time in the card cycle the "1" head 35' is connected by the commutator 37 and "1" will thus be recorded in each sector related to an energised core 12 of the distributor. Hence each sector must be scanned during one index point and if there are inaccuracies in gearing or core positioning or yoke timing this still leaves the recording accurately timed by the "0" mark sensing head 27**.

The sectors are shown in FIGURE 8 allocated into two equal halves, from which it can be seen that if a different value than "0" has been recorded in track **52*a*** then that amount would be added to the value recorded by the head in its particular value track.

I claim:

1. Apparatus for transferring signals from record means in which they are recorded in parallel columns, to a second, cyclically operated record means in which they are required to be recorded in groups of storage areas arranged one group to a column in serial order of columns, comprising, means for sensing the columns concurrently, in a series of stages, so that one record area of each column is sensed at each stage, means for operating the second record means so that at each stage the second record means goes through a cycle of operation in which are recorded upon it signals corresponding to the signals present at that stage in the columns of the first record means, a cyclical distributor, interconnection means for connecting said distributor to the first record means so that the signals derived from different columns of the first record means are fed by said interconnection means to different input circuits of said cyclical distributor, said interconnection means between the first record means and the distributor being a variable cross-connection means, for setting at the commencement of each transfer operation the relationship between the serial order of columns upon the second record means and the order of these columns upon the first record means to suit the requirements of that operation, so that signals derived from different columns at each stage are placed by said distributor, in a serial order of its input circuits, in a single output circuit, means for synchronizing the cyclical operation of the distributor with that of the second record means so that a signal derived from a particular column at any stage is fed to a selected group of storage areas of the second record means, and recording means for recording within each group of storage areas of the second record means, a signal derived from the first record means at any stage at a point appropriate to that stage.

2. Apparatus according to claim 1, in which stages of the columns of the first record means represent the integers 0 to 9, and within each group of record areas of the second record means is an area representing each of the integers 0 to 9, wherein said sensing means sense at each stage for which there is a column of the first record means having a signal at that stage, signals previously marked upon the second record means in the group of record areas corresponding to that column and control said record means to record in a position shifted through a distance appropriate to the integer represented in the first record means by that signal.

3. Apparatus for transferring signals from a record card in which they are recorded in columns, each of said columns including a plurality of index points, said apparatus comprising means for sensing all the columns of the record card simultaneously and each index point of a column in turn, recording means having a rotating magnetizable recording surface with timing marks and a track thereon, and distributing means operative during the sensing of each index point of a column for distributing to said recording means under joint control of said distributing means and said timing marks on the recording surface of said recording means, to record in successive positions of the track of said recording means the signals sensed in one index point at positions along the track having columnar significance and at that index point significance within said positions.

4. Apparatus as claimed in claim 3, wherein said distributing means comprises an inductive distributor synchronized with the recording surface of said recording means.

5. Apparatus as claimed in claim 4, further comprising commutative means, and separate recording heads, a different one of said recording heads being selected by said commutative means for each different index point of the record card.

6. Apparatus as claimed in claim 5, wherein the track of said recording means is a circular track on the circumference of a drum recording surface.

7. Apparatus as claimed in claim 5, wherein the track of said recording means is a circular track on a disc face of a recording surface.

8. Apparatus comprising sensing means for sensing the columns of a first record having data in a plurality of parallel columns in parallel index point by index point, a cyclically operable magnetizable record having positions denoting denominations and within each position areas denoting values, recording means for recording in any area, said cyclically operated magnetisable record having a track magnetically recorded with "0" value positions and sensing means to co-operate therewith to provide timing signals determining the exact time of magnetic recording in each area by the recording means, and distributing means operated synchronously with the magnetizable record, said distributing means having one storage position for each said column energized by said sensing means to store signals sensed at each index point in turn, means operating synchronously with said magnetizable record to deliver for the signal of an index point so stored an impulse operative to energize a recording circuit at times corresponding to recording positions, and means to select said recording means to record in areas within said selected positions.

References Cited in the file of this patent

UNITED STATES PATENTS

| | | |
|---|---|---|
| 2,540,654 | Cohen et al. | Feb. 6, 1951 |
| 2,727,685 | Wilson | Dec. 20, 1955 |